US009959676B2

(12) United States Patent
Barzuza et al.

(10) Patent No.: US 9,959,676 B2
(45) Date of Patent: *May 1, 2018

(54) PRESENTATION OF ENHANCED COMMUNICATION BETWEEN REMOTE PARTICIPANTS USING AUGMENTED AND VIRTUAL REALITY

(71) Applicant: Avaya Inc., Basking Ridge, NJ (US)

(72) Inventors: Tamar Barzuza, Tel Aviv (IL); Yair Wiener, Qiryat Ono (IL); Ori Modai, Ramat-Hasharon (IL)

(73) Assignee: Avaya Inc., Basking Ridge, NJ (US)

( * ) Notice: Subject to any disclaimer, the term of this patent is extended or adjusted under 35 U.S.C. 154(b) by 43 days.

This patent is subject to a terminal disclaimer.

(21) Appl. No.: 14/601,535

(22) Filed: Jan. 21, 2015

(65) Prior Publication Data
US 2015/0213650 A1 Jul. 30, 2015

Related U.S. Application Data

(60) Provisional application No. 61/931,234, filed on Jan. 24, 2014.

(51) Int. Cl.
*H04N 7/15* (2006.01)
*G06T 19/00* (2011.01)
(Continued)

(52) U.S. Cl.
CPC ........ *G06T 19/006* (2013.01); *G06F 3/04842* (2013.01); *H04L 12/18* (2013.01); *H04L 12/1827* (2013.01); *H04L 65/403* (2013.01); *H04L 67/38* (2013.01); *H04N 7/15* (2013.01); *H04N 7/157* (2013.01); *H04N 13/0429* (2013.01); *G02B 27/01* (2013.01); *G02B 27/017* (2013.01); *G02B 2027/014* (2013.01); *G02B 2027/0178* (2013.01)

(58) Field of Classification Search
CPC ...... G02B 2027/014; G02B 2027/0178; G02B 2027/01; G02B 2027/017; G06F 3/04842; G06T 19/006; H04L 12/18; H04L 65/403; H04L 67/38; H04N 13/0429; H04N 7/15; H04N 7/157
USPC ....................................... 348/14.07
See application file for complete search history.

(56) References Cited

U.S. PATENT DOCUMENTS 4,400,724 A  8/1983 Fields
5,272,526 A  12/1993 Yoneta et al.
(Continued)

FOREIGN PATENT DOCUMENTS

KR  20110066298 A  6/2011
WO  2012135554 A1  10/2012

*Primary Examiner* — Khai N Nguyen

(57) ABSTRACT

Embodiments disclosed herein provide methods, systems, and computer readable storage media for presenting a meeting between remote participants. In a particular embodiment, a method provides, during a conference session, compiling view information used to determine a first view seen by the first participant. The method further provides receiving conference video comprising at least video captured of a second participant remote to the physical location of the first participant. Also, the method provides presenting the video captured of the second participant such that the second participant appears at a first position of a meeting location in the first view to the first participant.

16 Claims, 9 Drawing Sheets

(51) Int. Cl.
*G06F 3/0484* (2013.01)
*H04L 29/06* (2006.01)
*H04N 13/04* (2006.01)
*H04L 12/18* (2006.01)
*G02B 27/01* (2006.01)

(56) References Cited

U.S. PATENT DOCUMENTS

| | | | |
|---|---|---|---|
| 5,534,914 A | 7/1996 | Flohr et al. | |
| 5,572,248 A | 11/1996 | Allen et al. | |
| 5,745,161 A | 4/1998 | Ito | |
| 6,330,022 B1 | 12/2001 | Seligmann | |
| 6,409,599 B1* | 6/2002 | Sprout | A63F 13/08 |
| | | | 463/31 |
| 6,545,700 B1* | 4/2003 | Monroe | H04M 3/567 |
| | | | 348/14.07 |
| 6,583,808 B2* | 6/2003 | Boulanger | H04N 7/15 |
| | | | 348/14.08 |
| 6,847,336 B1 | 1/2005 | Lemelson | |
| 7,050,078 B2 | 5/2006 | Dempski | |
| 7,057,582 B2 | 6/2006 | Ebersole | |
| 7,340,399 B2 | 3/2008 | Friedrich | |
| 7,346,654 B1 | 3/2008 | Weiss | |
| 7,764,247 B2 | 7/2010 | Blanco | |
| 7,990,889 B2 | 8/2011 | Beers et al. | |
| 8,612,511 B2 | 12/2013 | Friedrich | |
| 8,619,005 B2 | 12/2013 | Cok | |
| 8,643,951 B1 | 2/2014 | Wheeler | |
| 8,690,581 B2 | 4/2014 | Ruf | |
| 8,758,136 B2* | 6/2014 | Briggs | G07F 17/32 |
| | | | 463/39 |
| 8,767,014 B2 | 7/2014 | Vaught | |
| 8,767,306 B1 | 7/2014 | Miao | |
| 8,780,014 B2 | 7/2014 | Border | |
| 8,786,675 B2* | 7/2014 | Deering | G09G 3/02 |
| | | | 348/36 |
| 8,888,576 B2* | 11/2014 | Briggs | G07F 17/32 |
| | | | 463/30 |
| 9,142,062 B2* | 9/2015 | Maciocci | G06F 3/011 |
| 9,311,742 B1* | 4/2016 | Glover | G06T 15/08 |
| 9,384,594 B2* | 7/2016 | Maciocci | G06F 3/011 |
| 2002/0158873 A1* | 10/2002 | Williamson | G06T 15/20 |
| | | | 345/427 |
| 2003/0067536 A1* | 4/2003 | Boulanger | H04N 7/15 |
| | | | 348/14.08 |
| 2004/0104935 A1* | 6/2004 | Williamson | G06F 3/012 |
| | | | 715/757 |
| 2007/0279484 A1 | 12/2007 | Derocher et al. | |
| 2009/0189974 A1* | 7/2009 | Deering | G09G 3/02 |
| | | | 348/46 |
| 2011/0085018 A1 | 4/2011 | Culbertson et al. | |
| 2011/0211036 A1 | 9/2011 | Tran | |
| 2012/0024959 A1 | 2/2012 | Minagawa et al. | |
| 2012/0038742 A1 | 2/2012 | Robinson et al. | |
| 2012/0046072 A1 | 2/2012 | Choi | |
| 2012/0046768 A1* | 2/2012 | Raoufi | H04M 1/6058 |
| | | | 700/94 |
| 2012/0170800 A1 | 7/2012 | da Silva Frazão et al. | |
| 2012/0197991 A1 | 8/2012 | Ramani et al. | |
| 2012/0204120 A1 | 8/2012 | Lefar et al. | |
| 2012/0249591 A1* | 10/2012 | Maciocci | G06F 3/011 |
| | | | 345/633 |
| 2012/0262537 A1 | 10/2012 | Baker et al. | |
| 2012/0274736 A1 | 10/2012 | Robinson et al. | |
| 2012/0281059 A1 | 11/2012 | Chou et al. | |
| 2013/0038632 A1* | 2/2013 | Dillavou | G06F 3/1431 |
| | | | 345/633 |
| 2013/0076853 A1 | 3/2013 | Diao | |
| 2013/0141573 A1 | 6/2013 | Sutter et al. | |
| 2013/0194304 A1* | 8/2013 | Latta | G09G 3/003 |
| | | | 345/633 |
| 2013/0194389 A1* | 8/2013 | Vaught | G02B 27/017 |
| | | | 348/47 |
| 2013/0297409 A1* | 11/2013 | Jones | G06Q 30/0251 |
| | | | 705/14.45 |
| 2013/0303248 A1 | 11/2013 | Williams | |
| 2014/0063178 A1 | 3/2014 | Krans et al. | |
| 2014/0104368 A1 | 4/2014 | Tan | |
| 2014/0117073 A1 | 5/2014 | Bell | |
| 2014/0240444 A1 | 8/2014 | Szymczyk et al. | |
| 2014/0300758 A1 | 10/2014 | Tran | |
| 2015/0002541 A1* | 1/2015 | Dillavou | G06T 19/006 |
| | | | 345/633 |
| 2015/0312520 A1 | 10/2015 | Nohria et al. | |

* cited by examiner

PRESENTATION OF ENHANCED COMMUNICATION BETWEEN REMOTE PARTICIPANTS USING AUGMENTED AND VIRTUAL REALITY

RELATED APPLICATIONS

This application is related to and claims priority to U.S. Provisional Patent Application No. 61/931,234, entitled "Visual communication in augmented reality," filed on Jan. 24, 2014, and which is hereby incorporated by reference in its entirety.

TECHNICAL BACKGROUND

Conference call systems have long facilitated audio communications between participants at different locations. More recently some conference systems allow real-time video communications between participants. This allows a participant at one location to view live video and audio of other participants speaking even though those other participants may be very far away. Being able to view the other participants allows for a more productive conference as the participants can view each other's facial expressions, gestures, or other visual information that cannot be seen during an audio call.

While video conferencing has surely enhanced experience of remotely located participants, video conferencing falls short of making remote participants feel as though they are all in the same room. That is, participants sitting in a conference room watching other participants on a display screen does not adequately simulate those other participants being within the conference room. However, virtual reality headsets are now available that visually immerse users in visual experiences, such as video games. Similarly, augmented reality headsets are able to display information to a user while that user is still able to view the scene around them.

Overview

Embodiments disclosed herein provide methods, systems, and computer readable storage media for presenting a meeting between remote participants. In a particular embodiment, a method provides, during a conference session, compiling view information used to determine a first view seen by the first participant. The method further provides receiving conference video comprising at least video captured of a second participant remote to the physical location of the first participant. Also, the method provides presenting the video captured of the second participant such that the second participant appears at a first position of a meeting location in the first view to the first participant.

In some embodiments, the conference video further comprises video of the meeting location and the method further provides presenting the video of the meeting location.

In some embodiments, the method further provides transferring the view information to a conferencing server. In those embodiments, the conferencing server uses the view information to process the video captured of the second participant to account for a viewing angle of the first view relative to the first position of the meeting location.

In some embodiments, the method further provides using the view information to process the video captured of the second participant to account for a viewing angle of the first view relative to the first position of the meeting location.

In some embodiments, the meeting location comprises the physical location of the first participant.

In some embodiments, the method further provides determining where the first position is located within the physical location.

In some embodiments, the conference video further comprises video captured of a third participant remote to the physical location of the first participant and the method further provides presenting the video captured of the third participant such that the third participant appears at a second position of the meeting location in the first view to the first participant.

In some embodiments, the video captured of the second participant includes audio captured of the second participant and the method further provides presenting the audio captured of the second participant such that the audio captured of the second participant appears to be coming from the first position of the meeting location.

In some embodiments, compiling the view information comprises capturing video of a physical scene outward from the front of the HMD.

In some embodiments, the method further provides receiving information from a conferencing server that indicates the first position of the meeting location.

In another embodiment, a head mounted display (HMD) is provided for presenting a meeting between remote participants. The HMD includes a processing system configured to, during a conference session, compile view information used to determine a first view seen by a first participant wearing the HMD. The HMD further includes a communication interface configured to receive conference video comprising at least video captured of a second participant remote to the physical location of the first participant. Also, the HMD includes a display system configured to present the video captured of the second participant such that the second participant appears at a first position of a meeting location in the first view to the first participant.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
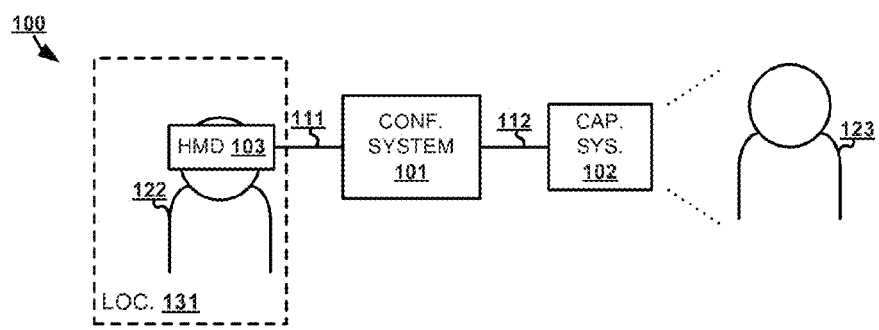
FIG. 1 illustrates a conferencing environment for presenting enhanced visual communication between remote participants.

FIG. 1 illustrates conferencing environment 100. Conferencing environment 100 includes conferencing system 101, participant capture system 102, and head mounted display (HMD) 103. Conferencing system 101 and participant capture system 102 communicate over communication link 112. Conferencing system 101 and AR HMD 103 communicate over communication link 111. Participant 122 wears HMD 103 and both are at location 131.

In operation, conferencing system 101 is configured to provide a conferencing experience to conferencing participants at different locations as though the participants are at the same location. To do this, conferencing system 101 uses AR or VR depending on whether HMD 103 is configured to present augmented reality (AR) or virtual reality (VR) video. AR allows participant 122 to see the world around them while HMD 103 overlays additional information. In some AR devices, such as a smartphone, the device captures video images and displays those images on a screen in a manner similar to using the screen as a viewfinder for a camera. AR information is overlaid on the displayed screen images in relation to what is displayed in the image. The AR information may be determined or stored locally by HMD 103, such as an indicator drawing participant 122's attention to a particular point, while other information may be determined or stored by conferencing system 101 (or another system outside of HMD 103), such as messages for a chat session. For example, information about a business having a storefront captured in the image may be displayed on the screen next to the storefront. In another example, a person in the AR view may have information displayed nearby the person, such as business card type information, so that it can easily be referenced. Alternatively, the AR information may be displayed on a see through medium, such as transparent lenses, which obviate the need to display the images that can be seen through the lenses.

In contrast, VR typically does not allow participant 122 to see the world around them. Participant 122 is therefore immersed in visuals provided by HMD 103. VR may display a real world scene captured for VR presentation or may display a virtual scene generated by a computer system. Regardless of whether the scene is real or virtual, VR video is able to overlay information not in that scene in a manner similar to AR. In some embodiments, HMD 103 may be configured to present both AR and VR video. In such cases, a conferencing session may switch from AR to VR, or vice versa, when presented by HMD 103 to participant 122. For example, while presenting AR video, participants physically located at location 131 other than participant 122 may leave location 131. Once that happens, HMD 103 may switch from presenting AR video to presenting VR video since participant 122 no longer needs to view the other participants at location 131.

For the purposes of facilitating a conference, HMD 103 in cooperation with conferencing system 101 uses AR or VR video to present captured video of conference participants not co-located with participant 122. For example, participant 122 is at location 131 while participant 123 is not. Participant 123 may be in a room down the hall from location 131 or may be on the other side of the world. Regardless of where participant 123 is located, HMD 103 worn by participant 122 allows participant 122 to view participant 123 at a position in location 131. Thus, rather than merely viewing video captured of participant 123 on a display, participant 122 can "see" participant 123 at location 131 thereby emulating the experience of participant 123 actually being co-located with participant 122.

Figure 2:
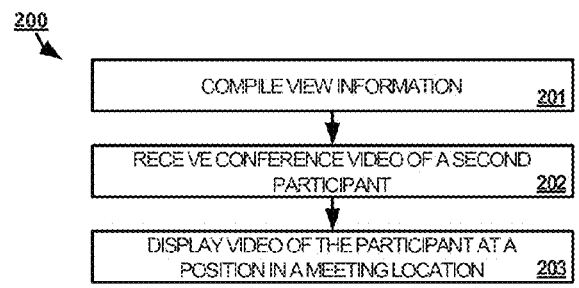
FIG. 2 illustrates a method of operating a head mounted display for presenting enhanced visual communication between remote participants.

FIG. 2 illustrates a method of operating HMD 103 in an example of presenting enhanced visual communication between remote participants. During a conference session facilitated by conferencing system 101, HMD 103 compiles view information used to determine a view seen by participant 122 (Step 201). The view information may be compiled from a variety of sensors included in or otherwise accessible by HMD 103, such as 3D gyro sensors, accelerometers, compass, eye tracking, forward facing camera, or some other type of sensor providing information that can be used to determine the view seen from participant 122. In some examples, HMD 103 processes the view information to determine the view of participant 122 while, in other examples, at least a portion of the processing of the view information is shared by conferencing system 101.

HMD 103 receives conference video comprising at least video captured of participant 123 remote to location 131 (step 202). In the case of VR video, video of a meeting location scene is also received by HMD 103. As noted above, the meeting location may be a real captured location (e.g. the location of participant 123 or another participant) or may be a virtual location rendered by conferencing system 101, HMD 103, or other system. In contrast, AR video visually augments the world around participant 122. Thus, HMD 122 does not need to receive video of the meeting location since the meeting location is location 131.

HMD 103 then presents the video captured of participant 123 such that the participant 123 appears at a position of the meeting location in the first view to participant 122 (step 203). Preferably, the position of the meeting location is a position wherein a participant would be located if the meeting location were a physical location. In an AR video example, location 131 is a meeting room having a conference table. Participant 123 will therefore be visually placed by HMD 103 at a position around the conference table that could otherwise have been occupied by a participant co-located with participant 122 at location 131. Alternatively, in a VR example, video of participant 123 may be overlaid onto the video of the meeting room scene or, if the meeting room is the location of participant 123, then the meeting room video and the video of participant 123 may be the same video.

Figure 3:
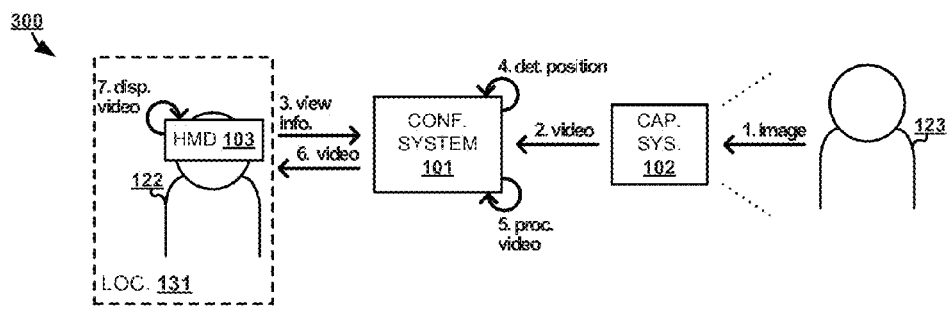
FIG. 3 illustrates an operational scenario of a conferencing environment for presenting enhanced visual communication between remote participants.

FIG. 3 illustrates operation 300 of conferencing environment 100 to present enhanced visual communication between remote participants. In operation 300, video is processed by conferencing system 101 before being transferred to HMD 103. In operation 200, video images are captured of participant 123 by capture system 102 at step 1. The video images may be captured in two dimensions or three depending on the capabilities of capture system 102, HMD 103, conferencing system 101 or otherwise. Also, video may be captured of participant 123 from different camera angles so that video of participant 123 can be presented from different angles depending on the viewpoint of participant 122. After capture, video of the captured video images is transferred in real time to conferencing system 101 at step 2. The video may be transferred in any format supported by capture system 102 and conferencing system 101. The video may be transferred over one or more various wired or wireless networks (local area, wide area, the Internet, cellular data network, and the like) or direct links depending on how far removed capture system 102 is from conferencing system 101.

At step 3, view information compiled by HMD 103 is transferred to conferencing system 101. This view information is also transferred in real time so that conferencing system 101 can use the recent information for processing the real time video of participant 123 received as part of step 2. The view information includes information collected from sensors of HMD 103 and is used by conferencing system 101 to determine a view of the meeting room. If HMD 103 is configured for AR, the view information may include video captured outward in front of HMD 103 in location 131 since location 131 will be the meeting room for the purposes of presenting video of participant 123. Conferencing system 101 may then use visual markers (e.g. pictures, tiling, plants, LED markers, infrared markers, etc.), which may or may not be intentionally placed within location 131 for use by conferencing system 101, within the video from HMD 103 to determine where participant 122 is positioned within location 131 and where participant 122 is looking from that position. Conferencing system 101 may also use information captured by other cameras at location 131 to identify the relative location of the visual markers. Additionally, in both AR and VR configurations, the view information includes information captured by sensors, such as a 3D gyroscope, that conferencing system 101 uses to determine the orientation of HMD 103, which would indicate whether participant 122 is tilting, turning, or otherwise moving their head or body.

At step 4, conferencing system 101 determines a position for the representation of participant 123 in the meeting location viewed by participant 122. Step 4 may be performed at any time before the representation of participant 123 is presented to participant 122 by HMD 103 and does not necessarily need to be performed after steps 1, 2, and 3. Conferencing system 101 may determine the position based on information received from HMD 103, including but not limited to the view information from step 3, other devices or sensors at the meeting location, participant 123, a meeting administrator, or any other source of potential position information. Using the information at its disposal, conferencing system 101 therefore determines a position within the meeting location where participant 123 could be located if participant 123 were at the meeting location, whether the meeting location is location 131 or a virtual location.

For example, if the meeting location includes a conference table, then conferencing system 101 may determine the position of participant 123 to be an empty seat at the conference table. The presence of the empty seat may be determined based on video captured from HMD 103 (e.g. analyzing the video to determine the presence of a person at each position), based on information manually entered by a participant or an administrator when deploying the system for a conference session (e.g. manually map the meeting room for locations of participants, chairs, etc.), based on pressure sensors in chairs at the table, or by any other means.

At step 5, conferencing system 101 processes the video received of participant 123 based on participant 122's view of the meeting location determined using the view information and the position determined for participant 123. That is, participant 123 should look to participant 122 as he or she would if the two participants were in the same room at their given positions. Thus, participant 123 may be seen as straight on, in profile, or some angle in between. As noted above, capture system 102 may need to capture participant 123 from different angles to account for the views from the position of participant 122 or other remote participants. In some cases, if multiple angles aren't available, then conferencing system 101 may estimate what participant 123 looks like from an un-captured angle. Alternatively, while not ideal, participant 123 may be presented from an angle that is captured even though that angle is not correct. Similarly, the size of participant 123 may be smaller if the position of participant 123 is determined to be further away from participant 122 in the meeting location. Additionally, conferencing system 101 may have to account for occlusions, such as other persons, plants, or other objects in the view from participant 123 to participant 122.

During processing step 5, conferencing system 101 may perform image segmentation on the video captured of participant 123 to identify the contour of participant 123 (e.g. using 3D imaging techniques if participant 123 is capture in 3D). By identifying the contour of participant 123, conferencing system 101 can remove the background so that only video of participant 123 remains. Once the background is removed, conferencing system 101 can manipulate the resulting image of participant 123 to maintain the relative location of participant 123 and distance of participant 123 from participant 122 in the meeting room. Moreover, in some cases, other objects may be separated from the background as well. For example, if participant 123 is holding a pen or document, then the pen or document may be remain in the video of participant 123.

After conferencing system 101 has processed the video, the video is transferred to HMD 103 at step 6. The video may be transferred over one or more various wired or wireless networks (local area, wide area, the Internet, cellular data network and the like) or direct links depending on how far removed HMD 103 is from conferencing system 101. In some examples, conferencing system 101 may be located at location 131. Upon receiving the video, HMD 103 displays the video to participant 122 at step 7. If HMD 103 is presenting AR video, then the presented video comprises video of participant 123 at the determined position location 131 as displayed on the transparent lenses. Alternatively, if HMD 103 is presenting VR video, then the presented video further includes video of the meeting location, whether it be a captured meeting location or a virtually generated meeting location. The video of participant 123 is overlaid on the meeting location video.

Steps 1-3 and 5-7 occur continually during a meeting to present participant 123 to participant 122 in a best effort to emulate participant 123's presence at the same meeting location with participant 122. Step 3 may only occur once unless conference system 101 determines that participant 123 should change positions during the meeting. For example, when an active speaker changes during a conferencing system, participant 123 may be displaced if the active speaker does not already have a position in the meeting room. Likewise, if another participant is brought into the meeting room, the position of participant 123 may be changed to accommodate the new participant. As participant 122 changes their orientation with HMD 103 (e.g. turns their head, moves positions in the meeting location, etc.), those changes in orientation are accounted for at step 5 when processing the video (i.e. participant 122's view during processing at step 5 would be different due to the change in orientation). That also means, in some cases, if participant 122 is not viewing the position of participant 123, participant 123 will not be shown in the AR video. Likewise, if participant 123's position is only partway visible, then the AR video will only show part of participant 123 accordingly.

In some configurations, audio playback devices at location 131 may be used to emulate the origin position of audio captured by capture system 102 in conjunction with the video of participant 123. That is, conferencing system 101 will select an audio device that is able to playback the captured audio and make it seem as though the audio is coming from the determined position of participant 123 in the meeting location. Thus, not only will HMD 103 make it look to participant 122 that participant 123 is at a particular location but the audio device will also make it sound like participant 123 is speaking from that location. In some examples, the audio device is located near the determined position of participant 123 while, in other examples, audio devices not near the determined positions, such as devices built into HMD 103, are used to simulate to the best of their ability the audio coming from the position of participant 123.

In some embodiments, another capture system captures participant 122 and participant 122 is presented to participant 123 through an HMD worn by participant 123 in a mirror of operation 300. Furthermore, additional participants may be at either location 131 (or additional locations not mentioned) and those additional participants are further emulated in the HMDs of other participants not co-located.

Figure 4:
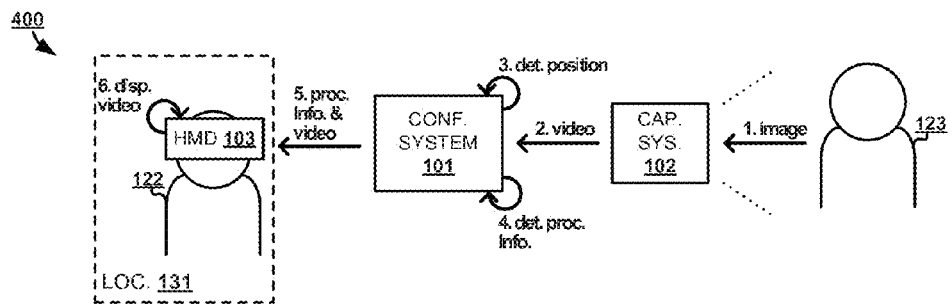
FIG. 4 illustrates an operational scenario of a conferencing environment for presenting enhanced visual communication between remote participants.

FIG. 4 illustrates operation 400 of conferencing environment 100 to present enhanced visual communication between remote participants. In operation 400, video transferred by conferencing system 101 requires additional processing before presentation by HMD 103. Steps 1 and 2 occur just as they did above in operation 300. Likewise, step 3 determines a position of participant 123 just as it did in step 4 of operation 300.

However, at step 4 of operation 400, conferencing system 101 determines processing information for the video of participant 123 rather than conferencing system 101 processing the video itself. In order to determine the processing information, conferencing system 101 uses the same type of information that it uses in step 5 of operation 300 to process the video. That is, conferencing system 101 may use view parameters received from HMD 103, or other information from HMD 103 or location 131, in order to determine how participant 123 should be presented to participant 122. Then processing parameters are generated to include at least enough information for HMD 103 to perform the processing performed by conferencing system 101 in step 5 of operation 300.

At step 5 in operation 400, the processing information and at least the video of participant 123 is transferred to HMD 103. The video of participant 123 may include multiple streams, if more than one angle of participant is captured either to provide different viewing angles of participant 123 or to generate a three dimensional view of participant 123. Furthermore, video of the meeting location, either real or virtual, may also be transferred to HMD 103 if HMD 103 is operating in a VR configuration.

Upon receipt of the processing information and the video, HMD 103 processes the video and displays the processed video at step 6. Accordingly, while the video processing duties shift from conferencing system 101 in operation 300 to HMD 103 in operation 400, the experience of participant 122 during presentation of the video by HMD 103 is substantially the same between the two operations. Also, as with operation 300, operation 400 may further process audio captured of participant 123 in conjunction with the video and transfer the audio to HMD 103 for presentation as though the audio is coming from the position where participant 123 is shown in the video.

While the above operations only apply to one remote participant, the operations can be performed on multiple remote participants to present those remote participants as thought they are in the same meeting room with participant 122 wearing HMD 103.

Referring back to FIG. 1, Conferencing system 101 comprises a computer processing system and communication interface. Conferencing system 101 may also include other components such as a router, server, data storage system, and power supply. Conferencing system 101 may reside in a single device or may be distributed across multiple devices. Conferencing system 101 could be an application server, personal workstation, or any other type of computing system capable of facilitating a multiparty conference—including combinations thereof.

Participant capture system 102 comprises one or more cameras for capturing participant 123 and communication circuitry for communicating with conferencing system 101. Capture system 102 may also include one or more microphones for capturing audio, a power supply, processing circuitry, or other components. Capture system 102 may reside in a single device or may be distributed across multiple devices. For example, capture system 102 may comprise separate camera and microphone components for capturing participant 123. In some examples, capture system 102 may include motors allowing system 102 to rotate, pan, or tilt. Capture system 102 may also include 3D capture and registration capabilities, such as depth or stereo sensing.

HMD 103 comprises a frame for participant 122 to wear HMD 103 on their head. Typically, AR HMD 103 will generally take the form of a pair of eyeglasses. HMD 103 further comprises a personal display for displaying video images to participant 122. The display may comprise an image projector that projects images onto lenses of HMD 103 or may be a display, such as an LCD, built into or in place of the lenses. HMD 103 further includes processing and communication circuitry and may include audio playback components, such as speakers or headphones. Additionally, HMD 103 may include video and audio capture components, such as a camera and a microphone.

Communication links 111 and 112 use metal, glass, air, space, or some other material as the transport media. Communication links 111 and 112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 111 and 112 could be direct links or may include intermediate networks, systems, or devices.

Figure 5:
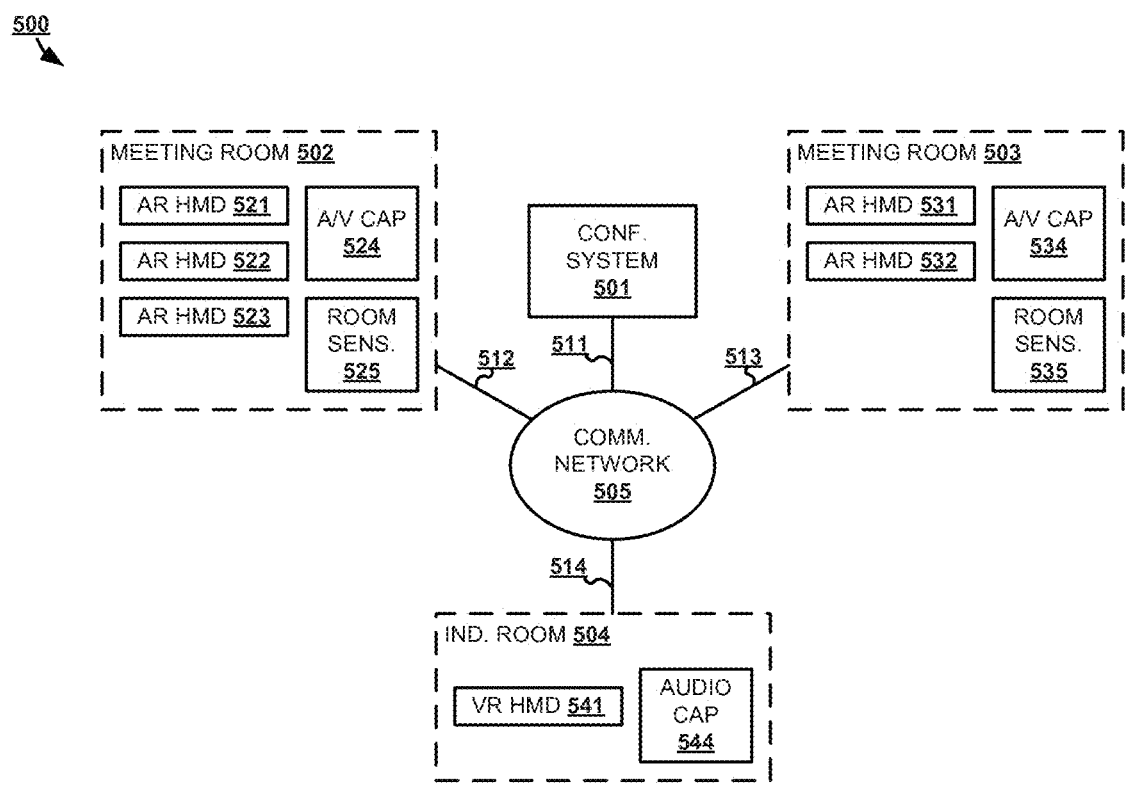
FIG. 5 illustrates a conferencing environment for presenting enhanced visual communication between remote participants.

FIG. 5 illustrates conferencing environment 500. Conferencing environment 500 includes conferencing system 501, meeting room 502, meeting room 503, individual room 504, and communication network 505. Meeting room 502 includes AR HMDs 521-523, audio/video capture devices 524, and room sensors 525. Meeting room 503 includes AR HMDs 531-532, audio/video capture devices 534, and room sensors 535. Individual room 504 includes Virtual Reality (VR) HMD 541 and audio capture 544. Communication network 505 communicates with conferencing system 501, meeting room 502, meeting room 503, and individual room 504 over communication links 511-514, respectively.

Communication network 505 comprises network elements that provide communications services to rooms 502-504 and conferencing system 501. Communication network 505 may comprise switches, wireless access nodes, Internet routers, network gateways, application servers, computer systems, communication links, or some other type of communication equipment—including combinations thereof. While shown as a single network, communication network 505 may comprise a collection of networks including local area networks, wide area networks, the Internet, or any other type of computing network—including combinations thereof.

Audio/video capture devices 524 and 534 comprise components, such as 2D or 3D cameras and microphones, that are used to capture video and audio of meeting rooms 502 and 503 and the participants located therein. A/V capture devices 524 and 534 may further include circuitry for wired or wireless networking, such as an Ethernet interface, Wi-Fi interface, Bluetooth module, or other type of communication interface. In some examples, certain components of A/V capture devices 524 and 534 may be included in AR HMDs 521-523 and 531-532.

Room sensors 525 and 535 include components that capture information used to determine participant position and view. Sensors 525 and 535 may include proximity sensors, RFID tags, infrared tags, compasses, sonic sensors, accelerometers, gyro sensors, or any other components that may provide relevant information. At least some of the components of sensors 525 and 535 may be incorporated into HMDs 521-523 and 531-532 and A/V capture devices 524 and 534.

In some examples, each of rooms 502-504 may further include an intermediate computer system that communicates with each rooms HMDs, A/V capture devices, and room sensors. The intermediate computer systems then communicate with conferencing system 501. In some configurations, some of the functions performed by conferencing system 501 may be handled by these intermediate computer systems on behalf of conferencing system 501.

Using the methods and operations described above, conferencing system 501 facilitates a meeting between participants wearing the HMDs in environment 500. In particular, the AR HMDs display remote participants within the meeting room where the respective AR HMDs are located. The VR HMD presents either a virtual meeting room into which the AR HMD participants are placed or the meeting room presented to the VR participant is one of meeting rooms 502 and 503 into which the VR participant is "positioned."

Figure 6:
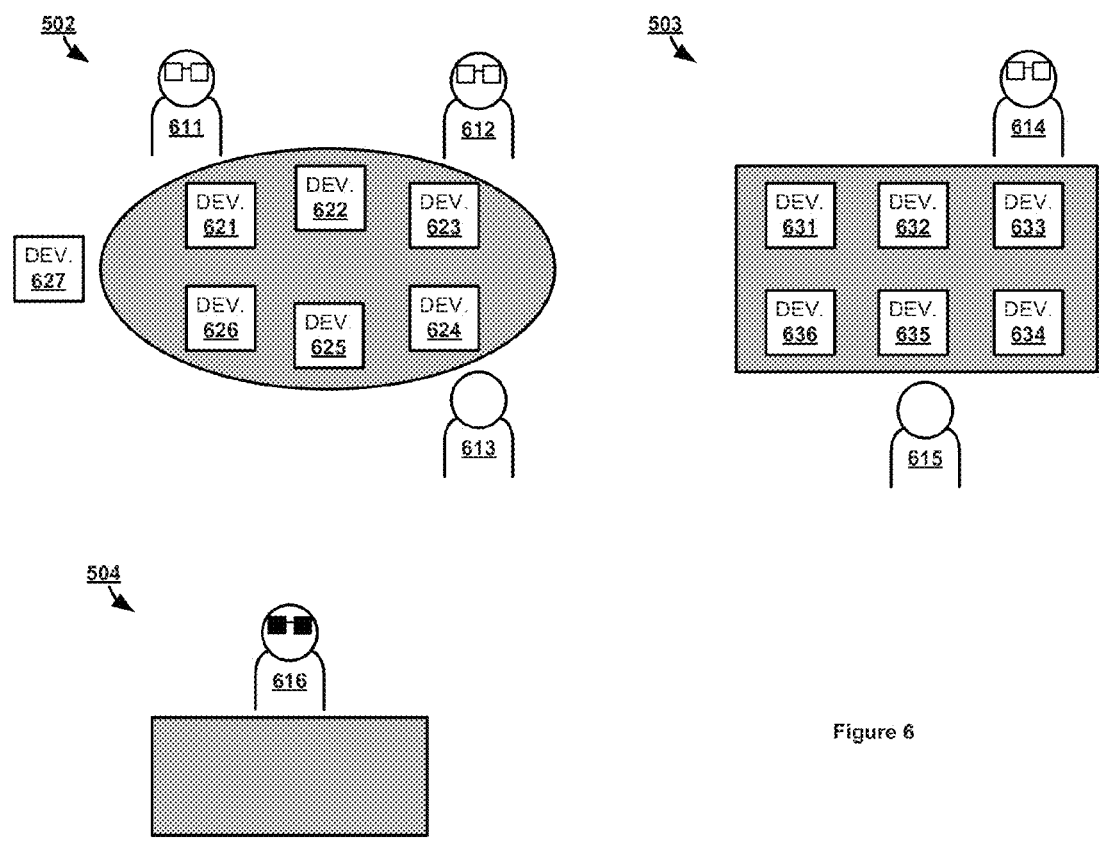
FIG. 6 illustrates example room orientations when presenting enhanced visual communication between remote participants.

FIG. 6 illustrates an example orientation of participants within rooms 502-504. In particular, meeting room 502 includes participants 611-613 who are wearing AR HMDs 521-523, respectively. Meeting room 503 includes participants 614 and 615 who are wearing AR HMDs 521-523, respectively. Independent room 504 includes participant 616 wearing VR HMD 441. In this example, meeting room 502 includes a conference table having six seating positions with a device 621-626 at each position. Each device 621-626 includes components of A/V capture devices 524 and room sensors 525. Meeting room 503 includes a conference table also having six seating positions with a device 631-636 at each position. Each device 631-636 includes components of A/V capture devices 534 and room sensors 535. Furthermore, in this example, audio capture device 544 is incorporated into VR HMD 541.

In operation, devices 621, 623, 624, 633, and 635 all have participants at their respective locations. Accordingly, once the conferencing session has started, these devices begin capturing audio and video of their respective participants and transferring that captured audio and video to conferencing system 501. Devices 622, 625, 626, 631, 632, 634, and 636 do not have participants at their positions but still capture audio and video to provide additional angles of the participants, which may be needed for presentation to remote participants. Additionally, each of AR HMDs 521-523 and 531-532 includes outward facing video cameras that capture and transfer video to conferencing system 501, which uses the video to determine a view of each participant and could also be used to generate additional angles of other participants in the room. Moreover, capture device 627 captures video of meeting room 502 for use in VR video and provide the visual prospective of the conference for participant 616 through VR HMD 541. It should further be understood, that device 627 may be used to capture AR video in addition to the VR video discussed in this example.

Upon receiving the audio, video, and other sensor information, conferencing system 401 performs the steps described in operations 300 or 400 above. Those operations allow conferencing system 401 in conjunction with the AR and VR HMDS to provide AR and VR video necessary for participants 611-616 all experience the conference session as though they are all in the same room.

Figure 7:
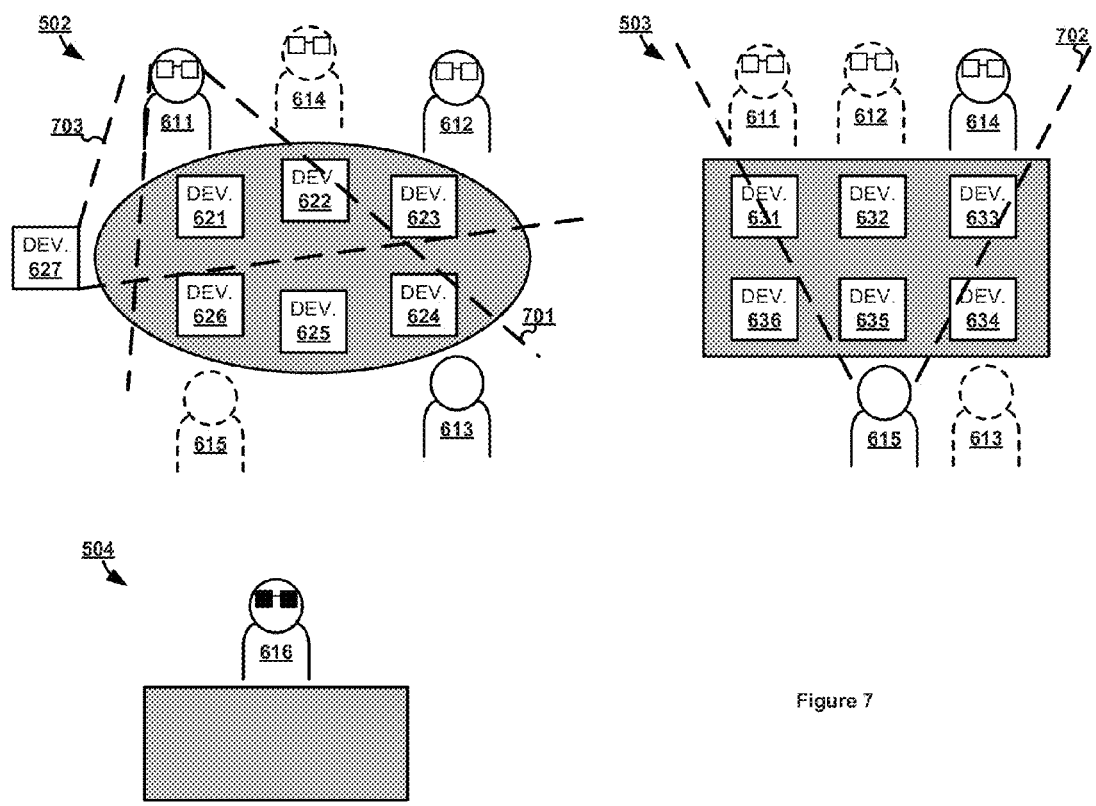
FIG. 7 illustrates example room orientations when presenting enhanced visual communication between remote participants.

FIG. 7 illustrates an example orientation of participants within rooms 502-504 once the participants are viewing the conference session through video provided by conferencing system 501. Specifically, as shown, conferencing system 501 has determined positions within each room 502 and 503 for the participants remote to each room. No position was determined for participant 616 in this example because no video was captured of participant 616, although, audio from participant 616 may be presented from a particular position. However, in some examples, video may be captured of participant 616 and, therefore, the open spot in each of rooms 502 and 503 may be taken by participant 616. Alternatively, participant 616 may be represented by an avatar or other graphical representation in place of real-time video of participant 616.

When viewed through their AR HMDs, participants 611-613 at room 502 are able to see video of participants 614-615 at positions in room 502 as though participants 614-615 are located in room 502. Likewise, participants 614-615 at room 503 are able to see video of participants 611-613 at positions in room 503 as though participants 611-613 are located in room 503. Image segmentation techniques discussed above allow the video image of each remote participant to be separated from the background image. Thus, local participants do not see video of the room in which the remote participants are physically located. In a particular example, view 701 is what participant 611 sees through their AR HMD 521. Even though the position of participant 615 is physically empty, the AR video presented to participant 611 makes it seem as though participant 615 is at that position. Similarly, view 702 is what participant 615 sees through their AR HMD 532. Even though the positions of participants 611 and 612 are physically empty, the AR video presented to participant 615 makes it seem as though participants 611 and 612 are at those positions.

As views 701 and 702 change (e.g. as participants 611 and 612 tilt or pan their heads), conferencing system 501 tracks those view changes and adjusts the video, or the processing information that an AR HMD would use to change and adjust the video, for each participant accordingly to ensure the remote participants continue to be presented in their correct positions. As such, in the case of view 701, as participant 611 turns their head more to the left, the AR video may no longer present participant 612 since participant 612 moves out of view and presents participant 614 "sitting" next to participant 611 as participant 614 moves into view.

Regarding participant 616, the VR video presented to participant 616 comprises view 703 captured by device 627. VR HMD 541 presents video of both meeting room 502 and participant 614 with the video of participant 614 overlaid on the video of meeting room 502 in the seating position between participants 611 and 612. Since the meeting room scene includes participants 611 and 612, who are physically located in meeting room 502, separate video of participants 611 and 612 is not necessary. As participant 616 moves their head to the right, view 703 changes and participant 613 comes into view as captured by device 627. Additionally, further to the right, video of participant 615 is further overlaid into the VR video such that participant 616 is able to see participant 615 as though participant 615 is in room 502. Device 627 may need to move itself to capture view 703 in accordance with participant 616's head movements or device 627 may capture video wide enough that only the portion of that wide angle view displayed by VR HMD 441 changes.

Additionally, to increase the effectiveness of the AR video, audio from each remote participant is played from the device at that participant's position. For example, if participant 614 is speaking, then device 622 will present the audio of participant 614 so that participants 611-613 hear participant 614 as though participant 614 is actually at the position in room 502 presented in the AR video. Alternatively, each of AR HMDs 521-523 may include audio speakers arranged in such a way as to simulate the audio coming from the position of participant 614 in room 502. Furthermore, any device in rooms 502 and 503 may present the audio captured for participant 616. However, if a position is determined for participant 616 in either or both of rooms 502 and 503, then the audio may be presented as though it comes from that determined position.

Figure 8:
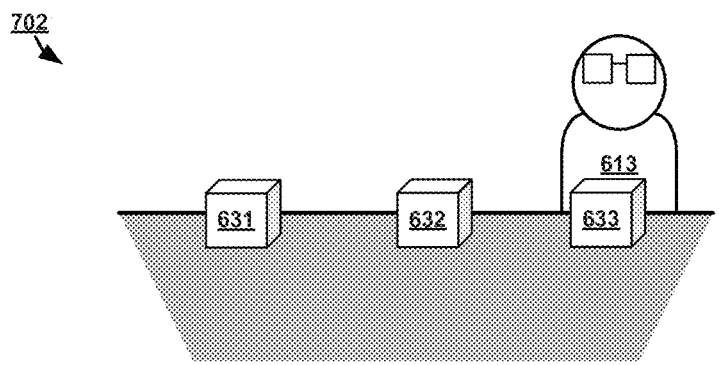
FIG. 8 illustrates an example participant view when presenting enhanced visual communication between remote participants.

FIG. 8 illustrates view 702 from the perspective of participant 615 in meeting room 503. In particular, view 702 in FIG. 8 represents the view before AR HMD 532 is presenting video. Thus, participant 615 is basically viewing meeting room 503 as though its through a normal transparent set of glasses and is only able to see participant 613, devices 631-633, and the conference table that are all physically located in meeting room 403. Moreover, view 702 represents video that may be used as view information to determine the view and position of participant 615 within meeting room 503.

Figure 9:
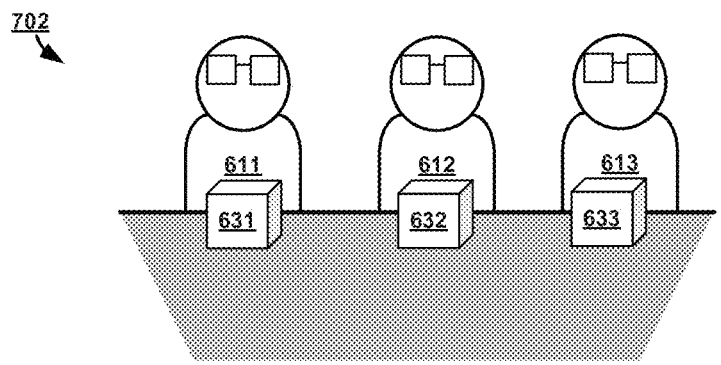
FIG. 9 illustrates an example participant view when presenting enhanced visual communication between remote participants.

FIG. 9 then illustrates view 702 from the same perspective of participant 615 once a meeting has started. As previously shown in FIG. 7, remote participants 611 and 612 are positioned in the two positions next to local participant 614. Therefore, AR HMD 532 displays video of participants 611 and 612 in their determined positions. Furthermore, when displaying the video of participants 611 and 612 objects that are between the positions of participants 611 and 612 (i.e. devices 631 and 632) are accounted for by displaying the video of participants 611 and 612 as being obscured by devices 631 and 632. Also, if participant 615 were to turn their head, to the right in this example, the video of participant 611 may move out of view and no longer be displayed while video of participant 613 comes into view. In that example, participant 613 may be shown from a profile view unless participant 613 is "looking at" participant 615 to best display participant 613 as though he or she is physically sitting next to participant 615. Accordingly, by displaying remote participants from the proper angle, accounting for objects that may obscure the view of participants at their designated positions, and adjusting for movement of participant 615, as AR HMD 532 does in this embodiment, participant 615 is able to view the remote meeting participants as though they are locating in room 503 with participant 615.

In some examples, AR HMD 532 inserts presentation information into the video viewed by participant 615. For example, the information may include presentation slides that seem to be projected onto a wall behind participants 611-613 or onto the table of meeting room 503. Alternatively, the information could be presented in a manner independent of any physical features in room 503. Likewise, other information may be presented, such as chat windows, contextual information related to the conference session, or any other visual information that a participant may find useful. Furthermore, the presentation information may include objects that are presented in a manner similar to that of remote participants. For example, an object may be placed on the table in room 503. The object may be captured from multiple angles by devices 631-636 and presented to participants 611-613 through their respective HMDs 521-523. In particular, the object may be presented in the center of the table in room 502 with the front of the object facing device 625. Accordingly, participants 611 and 612 are able to view the back of the object from an angle and participant 613 is able to view the front of the object from an angle.

Figure 10:
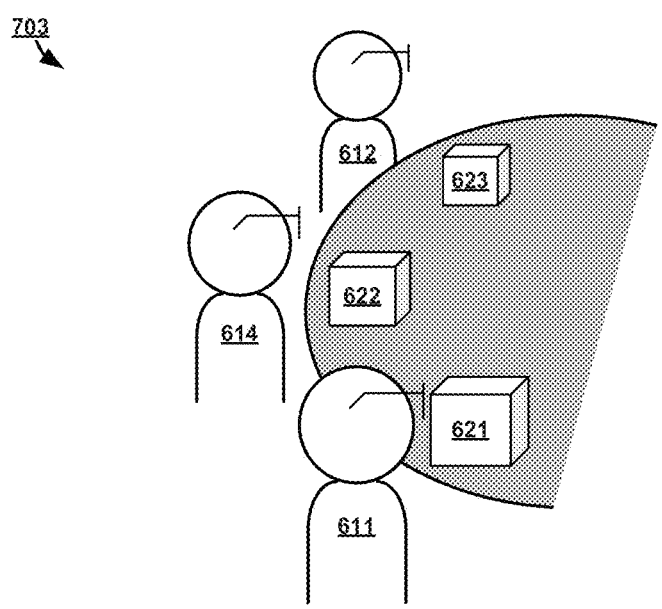
FIG. 10 illustrates an example participant view when presenting enhanced visual communication between remote participants.

FIG. 10 then illustrates view 703 from the same perspective of participant 616 once a meeting has started. Since participant 616 is a virtual reality participant, the view of room 504 is irrelevant and is not incorporated into the video displayed through VR HMD 541. The meeting room presented to participant 616 is video captured of meeting room 502 rather than rendering a virtual meeting room for presentation. Since the video is actual video of meeting room 502, participants physically located within room 502 are already included in that video. However, participant 614 is remote to room 502 and video of participant 614 is therefore overlaid on the video of room 502. Moreover, participant 614 is shown from a profile view to account for participant 614's position relative to view 703. Of course, if participant 614 were to turn towards participant 616, then the orientation of the video of participant 614 would change to show participant 614 facing participant 616.

Additionally, since the position of participant 614 is somewhat obscured by participant 611, video of participant 614 is presented such that participant 614 looks as though he or she is partially behind participant 611 as would be the case if participant 614 was physically in room 502. If participant 616 were to move their head to the right, the video of meeting room 502 may pan to the right and the overlay of participant 614 may move out of view while an overlay of participant 615 moves into view. Furthermore, as in the AR example above, additional visual information, such as conference slides, chat windows, etc., may also be presented in the VR video to participant 616.

Figure 11:
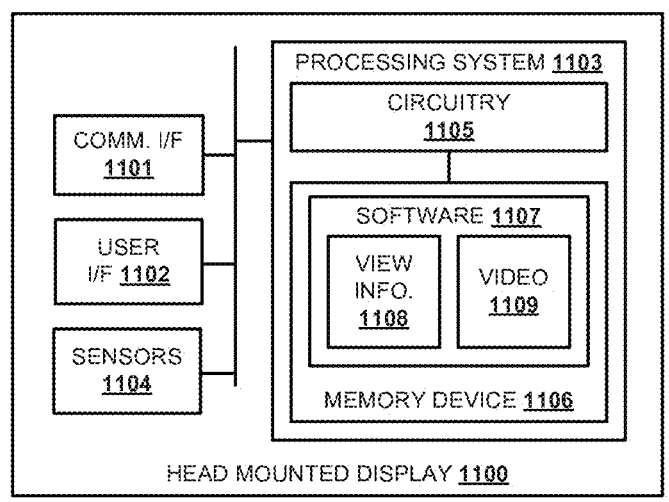
FIG. 11 illustrates a head mounted device for presenting enhanced visual communication between remote participants.

FIG. 11 illustrates head mounted display 1100. Head mounted display 1100 is an example of head mounted display 103, although head mounted display 103 could use alternative configurations. Head mounted display 1100 comprises communication interface 1101, user interface 1102, processing system 1103, and sensors 1104. Processing system 1103 is linked to communication interface 1101 and user interface 1102. Processing system 1103 includes processing circuitry 1105 and memory device 1106 that stores operating software 1107. Head mounted display 1100 may include other well-known components such as a battery and enclosure that are not shown for clarity. Head mounted display 1100 may be a personal computer, server, or some other computing apparatus—including combinations thereof. In some examples, head mounted display 1100 may be replicated across multiple locations in order to distribute the processing load required to function as described herein.

Communication interface 1101 comprises components that communicate over communication links, such as network cards, ports, RF transceivers, processing circuitry and software, or some other communication devices. Communication interface 1101 may be configured to communicate over metallic, wireless, or optical links. Communication interface 1101 may be configured to use TDM, IP, Ethernet, optical networking, wireless protocols, communication signaling, or some other communication format—including combinations thereof.

User interface 1102 comprises components that interact with a user to receive user inputs and to present media and/or information. Specifically, user interface 1102 includes a display for presenting video in the manner described above. User interface 1102 may include a speaker, microphone, buttons, lights, display screen, touch screen, touch pad, scroll wheel, communication port, or some other user input/output apparatus—including combinations thereof.

Sensors 1104 comprise components that capture information relevant to determining the view from or orientation of head mounted display 1100. Sensors 1104 may include a forward facing video camera, 3D gyroscope, accelerometer, eye tracking sensor, or other type of sensor—including combinations thereof.

Processing circuitry 1105 comprises microprocessor and other circuitry that retrieves and executes operating software 1107 from memory device 1106. Memory device 1106 comprises a non-transitory storage medium, such as a disk drive, flash drive, data storage circuitry, or some other memory apparatus. Processing circuitry 1105 is typically mounted on a circuit board that may also hold memory device 1106 and portions of communication interface 1101 and user interface 1102. Operating software 1107 comprises computer programs, firmware, or some other form of machine-readable processing instructions. Operating software 1107 includes view information module 1108 and video presentation module 1109. Operating software 1107 may further include an operating system, utilities, drivers, network interfaces, applications, or some other type of software. When executed by processing circuitry 1105, operating software 1107 directs processing system 1103 to operate head mounted display 1100 as described herein.

In particular, view information module 1108 directs processing system 1103 to, during a conference session, compile view information from sensors 1104 used to determine a first view seen by a first participant wearing head mounted display 1100. Video presentation module 1109 directs processing system 1103 to receive, via communication interface 1101, conference video comprising at least video captured of a second participant remote to the physical location of the first participant. Video presentation module 1109 further directs processing system 1103 to present, via user interface 1102, the video captured of the second participant such that the second participant appears at a first position of a meeting location in the first view to the first participant.

Figure 12:
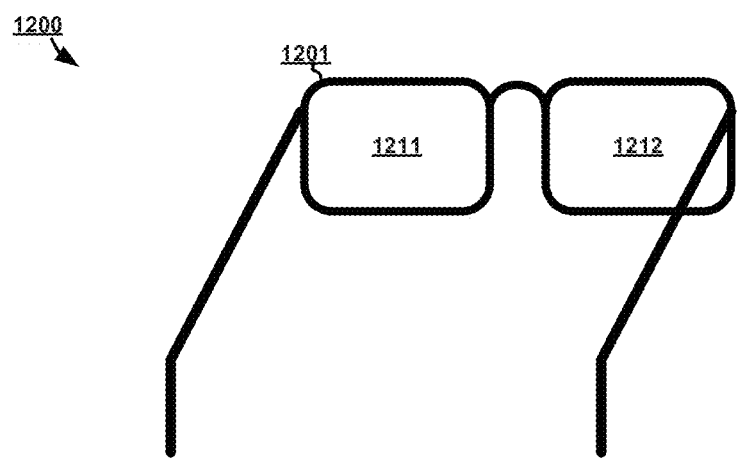
FIG. 12 illustrates an example form factor for a head mounted device for presenting enhanced visual communication between remote participants.

FIG. 12 illustrates an example form factor of head mounted display 1100. Specifically, FIG. 12 provides glasses 1200, which include frame 1201 and lenses 1211-1212. Without substantially deviating from the form factor of glasses 1200 (e.g. goggles, visor, etc.), processing circuitry may be incorporated into frame 1201 or otherwise attached to frame 1201. Moreover, lenses 1211-1212 may incorporate a transparent or opaque display system depending on whether glasses 1200 are configured for AR or VR video, respectively. Alternatively, frame 1201 may include a projector type display for projecting video images onto lenses 1211-1212. For VR video, the glasses may include more contour fitting elements to block out external light reaching the participant's eyes when viewing the VR video. Likewise, lenses 1211-1212 may be omitted in some VR examples and replaced with one or more display screens.

In some examples, at least a portion of the processing and communication circuitry may be separate from glasses 1200 while still being considered part of head mounted display 1100. For instance, a wearable computing unit (or a computing unit otherwise located nearby glasses 1200) may communicate with glasses 1200 over a wired or wireless (e.g. Bluetooth, Wi-Fi, etc.) connection. The wearable computing unit may perform the bulk of the processing and network communications necessary for glasses 1200 to perform as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A non-transitory computer readable storage medium having instructions stored thereon for presenting a conference session established by a conferencing system to facilitate a meeting between remote participants that each use Augmented Reality (AR) or Virtual Reality (VR) to participate in the meeting, the instructions, when executed by a head mounted display (HMD) worn by a first participant of the remote participants, direct the HMD to:

during the conference session, compile view information used to determine a first view seen by the first participant located at a meeting location, wherein the first view includes what the first participant sees of the meeting location through transparent lenses of the HMD;

receive, via a communication interface of the HMD, a conference video stream comprising at least video captured of a second participant, of the remote participants, remote to the meeting location; and present the video captured of the second participant on the transparent lenses such that the second participant appears at a first position of the meeting location in the first view to the first participant to appear as though the second participant is physically at the meeting location with the first participant.

2. The non-transitory computer readable medium of claim 1, wherein the instructions further direct the HMD to:
transfer the view information to a conferencing server; and
wherein the conferencing server uses the view information to process the video captured of the second participant to account for a viewing angle of the first view relative to the first position of the meeting location.

3. The non-transitory computer readable medium of claim 1, wherein the instructions further direct the HMD to:
use the view information to process the video captured of the second participant to account for a viewing angle of the first view relative to the first position of the meeting location.

4. The non-transitory computer readable medium of claim 1, wherein the instructions further direct the HMD to:
determine where the first position is located within the meeting location.

5. The non-transitory computer readable medium of claim 1, wherein the conference video stream further comprises video captured of a third participant remote to the physical location of the first participant, and the instructions further direct the HMD to:
present the video captured of the third participant such that the third participant appears at a second position of the meeting location in the first view to the first participant.

6. The non-transitory computer readable medium of claim 1, wherein the video captured of the second participant includes audio captured of the second participant, and the instructions further direct the HMD to:
present the audio captured of the second participant such that the audio captured of the second participant appears to be coming from the first position of the meeting location.

7. The non-transitory computer readable medium of claim 1, wherein to compile the view information the instructions direct the HMD to:
capture video of a physical scene outward from the front of the HMD.

8. The non-transitory computer readable medium of claim 1, wherein the instructions further direct the HMD to:
receive information from a conferencing server that indicates the first position of the meeting location.

9. A head mounted display (HMD) for presenting a conference session established by a conferencing system to facilitate a meeting between remote participants that each use Augmented Reality (AR) or Virtual Reality (VR) to participate in the meeting, the HMD comprising:
a processing system configured to, during a conference session for the meeting, compile view information used to determine a first view seen by a first participant of the AR and VR participants wearing the HMD and located at a meeting location, wherein the first view includes what the first participant sees of the meeting location through transparent lenses of the HMD;
a communication interface configured to receive a conference video stream comprising at least video captured of a second participant, of the AR and VR participants, remote to the meeting location; and
a display system configured to present the video captured of the second participant on the transparent lenses such that the second participant appears at a first position of the meeting location in the first view to the first participant to appear as though the second participant is physically at the meeting location with the first participant.

10. The HMD of claim 9, further comprising:
the communication interface configured to transfer the view information to a conferencing server; and
wherein the conferencing server uses the view information to process the video captured of the second participant to account for a viewing angle of the first view relative to the first position of the meeting location.

11. The HMD of claim 9, further comprising:
the processing system configured to use the view information to process the video captured of the second participant to account for a viewing angle of the first view relative to the first position of the meeting location.

12. The HMD of claim 9, further comprising:
the processing system configured to determine where the first position is located within the meeting location.

13. The HMD of claim 9, wherein the conference video stream further comprises video captured of a third participant remote to the physical location of the first participant, and the HMD further comprising:
the display system configured to present the video captured of the third participant such that the third participant appears at a second position of the meeting location in the first view to the first participant.

14. The HMD of claim 9, wherein the video captured of the second participant includes audio captured of the second participant, and the HMD further comprising:
an audio system configured to present the audio captured of the second participant such that the audio captured of the second participant appears to be coming from the first position of the meeting location.

15. The HMD of claim 9, further comprising:
a video capture system configured to capture video of a physical scene outward from the front of the HMD; and
wherein the processing system configured to compile the view information comprises the processing system configured to receive the captured video of the physical scene outward from the front of the HMD.

16. The HMD of claim 9, further comprising:
the communication interface configured to receive information from a conferencing server that indicates the first position of the meeting location.

* * * * *